US009315708B2

(12) United States Patent
Guerin et al.

(10) Patent No.: US 9,315,708 B2
(45) Date of Patent: Apr. 19, 2016

(54) HEAT-TRANSFER COMPOSITIONS EXHIBITING IMPROVED MISCIBILITY WITH THE LUBRICATING OIL

(75) Inventors: Sophie Guerin, Francheville (FR); Laurent Abbas, Narberth, PA (US); Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 181 days.

(21) Appl. No.: 14/115,542

(22) PCT Filed: Mar. 28, 2012

(86) PCT No.: PCT/FR2012/050653
§ 371 (c)(1),
(2), (4) Date: Nov. 4, 2013

(87) PCT Pub. No.: WO2012/150391
PCT Pub. Date: Nov. 8, 2012

(65) Prior Publication Data
US 2014/0075969 A1    Mar. 20, 2014

(30) Foreign Application Priority Data
May 4, 2011    (FR) ..................................... 11.53801

(51) Int. Cl.
C09K 5/04       (2006.01)
C10M 171/00   (2006.01)
F25B 45/00     (2006.01)

(52) U.S. Cl.
CPC ............ *C09K 5/045* (2013.01); *C10M 171/008* (2013.01); *F25B 45/00* (2013.01); *C09K 2205/126* (2013.01); *C09K 2205/22* (2013.01); *C10M 2209/1033* (2013.01); *C10N 2220/022* (2013.01); *C10N 2240/30* (2013.01)

(58) Field of Classification Search
CPC .... C09K 5/04; C09K 5/045; C09K 2205/126; C09K 2205/22; C10M 171/008; C10M 171/00; C10M 2209/1033; C10N 2220/022; C10N 2240/30; F25B 45/00
USPC ........ 252/68, 69; 62/77, 324.1, 340, 498, 115
See application file for complete search history.

(56) References Cited

U.S. PATENT DOCUMENTS

| | | | |
|---|---|---|---|
| 4,755,316 A | 7/1988 | Magid et al. | |
| 4,971,712 A | 11/1990 | Gorski et al. | |
| 4,975,212 A | 12/1990 | Thomas et al. | |
| 5,008,028 A | 4/1991 | Jolley et al. | |
| 7,279,451 B2 | 10/2007 | Singh et al. | |
| 7,534,366 B2 | 5/2009 | Singh et al. | |
| 8,070,977 B2 | 12/2011 | Rached | |
| 8,075,798 B2 | 12/2011 | Rached | |
| 8,246,850 B2 | 8/2012 | Rached | |
| 8,252,198 B2 | 8/2012 | Rached | |
| 8,557,135 B2 | 10/2013 | Rached | |
| 8,808,569 B2 | 8/2014 | Rached | |
| 8,858,824 B2 | 10/2014 | Boussand | |
| 8,858,825 B2 | 10/2014 | Guerin et al. | |
| 9,011,711 B2 | 4/2015 | Rached | |
| 9,028,706 B2 | 5/2015 | Rached et al. | |
| 9,039,922 B2 | 5/2015 | Rached | |
| 9,127,191 B2 | 9/2015 | Rached | |
| 9,133,379 B2 | 9/2015 | Rached | |
| 2003/0032563 A1 | 2/2003 | Tazaki | |
| 2004/0089839 A1* | 5/2004 | Thomas et al. | 252/67 |
| 2004/0119047 A1 | 6/2004 | Singh et al. | |
| 2005/0145823 A1 | 7/2005 | Yamada et al. | |
| 2006/0243944 A1* | 11/2006 | Minor et al. | 252/67 |
| 2006/0243945 A1* | 11/2006 | Minor et al. | 252/67 |
| 2007/0004605 A1 | 1/2007 | Matsumura et al. | |
| 2009/0241562 A1 | 10/2009 | Thomas et al. | |
| 2010/0047189 A1* | 2/2010 | Seeton et al. | 424/47 |
| 2010/0175421 A1 | 7/2010 | Kaneko et al. | |
| 2010/0282999 A1 | 11/2010 | Shimomura et al. | |
| 2011/0084228 A1 | 4/2011 | Rached | |
| 2011/0095224 A1 | 4/2011 | Rached | |
| 2011/0120175 A1 | 5/2011 | Kamishima et al. | |
| 2011/0186772 A1 | 8/2011 | Rached | |
| 2011/0219791 A1 | 9/2011 | Rached | |
| 2011/0219792 A1 | 9/2011 | Rached | |
| 2011/0240254 A1 | 10/2011 | Rached | |
| 2011/0284181 A1 | 11/2011 | Rached | |
| 2012/0049104 A1 | 3/2012 | Rached | |
| 2012/0056123 A1 | 3/2012 | Rached | |

(Continued)

FOREIGN PATENT DOCUMENTS

JP    2005-171233 A    6/2005
JP    2010-024410        2/2010

(Continued)

OTHER PUBLICATIONS

International Search Report (PCT/ISA/210) mailed on Jul. 16, 2012, by the Patent Office as the International Searching Authority for International Application No. PCT/FR2012/050653.
U.S. Appl. No. 14/651,855, Collier, et al.
U.S. Appl. No. 14/651,925, Deur-Bert, et al.
Puhl, Christian, "Refrigeration Oils for Future Mobile A/C Systems", Fuchs Europe Schmierstoffe, 2009, retrieved from the internet: http://www.r744.com/assets/link/FUCHS_Puhl_VDA%20Winter%20Meeting%202009.pdf, 18 pages.
Collier, Bertrand, et al., U.S. Appl. No. 14/651,855 entitled "Composition Including 2,3,3,3-Tetrafluoropropene," filed in the U.S. Patent and Trademark Office on Jun. 12, 2015.
Deur-Bert, Dominique, et al., U.S. Appl. No. 14/651,925 entitled "Composition Containing 2,3,3,3-Tetrafluoropropene and 1,2-Difluoroethylene," filed in the U.S. Patent and Trademark Office on Jun. 12, 2015.

(Continued)

*Primary Examiner* — Douglas McGinty
(74) *Attorney, Agent, or Firm* — Buchanan Ingersoll & Rooney P.C.

(57) ABSTRACT

The invention relates to the use of 1,1,1,2-tetrafluoroethane for increasing the miscibility of 2,3,3,3-tetrafluoropropene with a lubricating oil, and in particular with a polyalkylene glycol oil. In this regard, the invention provides heat-transfer compositions and also equipment and processes using these compositions.

17 Claims, 1 Drawing Sheet

(56) References Cited

U.S. PATENT DOCUMENTS

| | | |
|---|---|---|
| 2012/0068105 A1 | 3/2012 | Rached et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2012/0272668 A1 | 11/2012 | Van Horn et al. |
| 2012/0298909 A1 | 11/2012 | Low |
| 2013/0092869 A1 | 4/2013 | Boussand |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |

FOREIGN PATENT DOCUMENTS

| | | |
|---|---|---|
| JP | 2011-246587 | 12/2011 |
| WO | WO 01/48127 A1 | 7/2001 |
| WO | WO 2004/037913 A2 | 5/2004 |
| WO | WO 2005/042663 A1 | 5/2005 |
| WO | WO 2005/103187 A1 | 11/2005 |
| WO | WO 2006/094303 A | 9/2006 |
| WO | WO 2008/153106 A1 | 12/2008 |
| WO | WO 2009/057475 A1 | 5/2009 |
| WO | WO 2010/010917 A1 | 1/2010 |
| WO | WO 2010/022018 A2 | 2/2010 |
| WO | WO 2011/023923 A | 3/2011 |

OTHER PUBLICATIONS

U.S. Appl. No. 14/655,500, Deur-Bert, et al.
U.S. Appl. No. 14/823,430, Rached.
U.S. Appl. No. 14/830,130, Rached.
U.S. Appl. No. 14/772,950, Bonnet, et al.
U.S. Appl. No. 14/873,855, Rached.
U.S. Appl. No. 14/873,891, Rached.
Deur-Bert, Dominique, et al., U.S. Appl. No. 14/655,500 entitled "Azeotropic or Quasi-Azeotropic Composition of Chloromethane," filed Jun. 25, 2015.
Rached, Wissam, U.S. Appl. No. 14/823,430 entitled "Use of Ternary Compositions," filed Aug. 11, 2015.
Rached, Wissam, U.S. Appl. No. 14/830,130 entitled "Binary Refrigerating Fluid," filed Aug. 19, 2015.
Bonnet, Phillippe, et al., U.S. Appl. No. 14/772,950 entitled "Composition Comprising HF and 2,3,3,3-Tetrafluoropropene," filed Sep. 4, 2015.
Rached, Wissam, U.S. Appl. No. 14/873,855 entitled "Heat Transfer Fluid," filed Oct. 2, 2015.
Rached, Wissam, U.S. Appl. No. 14/873,891 entitled "Ternary Compositions for Low-Capacity Refrigeration," filed Oct. 2, 2015.

* cited by examiner

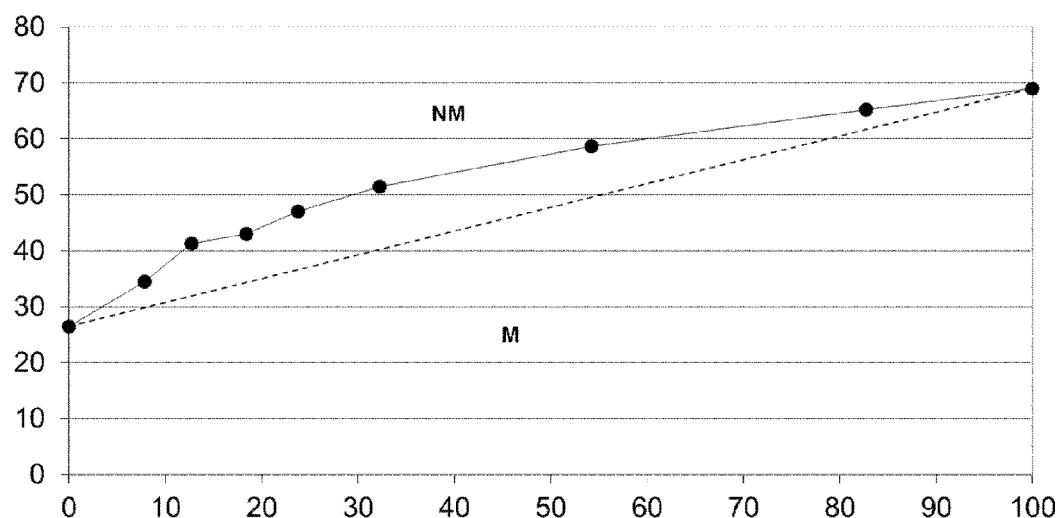

HEAT-TRANSFER COMPOSITIONS EXHIBITING IMPROVED MISCIBILITY WITH THE LUBRICATING OIL

FIELD OF THE INVENTION

The present invention relates to heat-transfer compositions based on 2,3,3,3-tetrafluoropropene which have improved miscibility with lubricant oil.

TECHNICAL BACKGROUND

Fluids based on fluorocarbon compounds are widely used in vapor compression heat-transfer systems, especially air-conditioning, heat-pump, refrigeration or freezing devices. The common feature of these devices is that they are based on a thermodynamic cycle comprising vaporization of the fluid at low pressure (in which the fluid absorbs heat); compression of the vaporized fluid up to a high pressure; condensation of the vaporized fluid to liquid at high pressure (in which the fluid expels heat); and depressurization of the fluid to complete the cycle.

The choice of a heat-transfer fluid (which may be a pure compound or a mixture of compounds) is dictated firstly by the thermodynamic properties of the fluid, and secondly by additional constraints. Thus, a particularly important criterion is that of the environmental impact of the fluid under consideration. In particular, chlorinated compounds (chlorofluorocarbons and hydrochlorofluorocarbons) have the drawback of damaging the ozone layer. Non-chlorinated compounds are therefore now generally preferred, such as hydrofluorocarbons, fluoro ethers and fluoro olefins.

Another environmental constraint is that of the global warming potential (GWP). It is thus essential to develop heat-transfer compositions which have a GWP that is as low as possible and good energy performance qualities.

Moreover, to lubricate the moving parts of the compressor(s) of a vapor compression system, a lubricant oil must be added to the heat-transfer fluid. The oil may generally be mineral or synthetic.

The choice of lubricant oil is made as a function of the type of compressor, and so as not to react with the heat-transfer fluid itself or with the other compounds present in the system.

For certain heat-transfer systems (especially small ones), the lubricant oil is generally permitted to circulate throughout the circuit, the pipework being designed such that the oil can flow by gravity to the compressor. In other heat-transfer systems (especially large ones), an oil separator is provided immediately after the compressor, and also an oil level management device, which ensures return of the oil to the compressor(s). Even when an oil separator is present, the pipework of the system must still be designed such that the oil can return by gravity to the oil separator or to the compressor.

Document WO 2004/037 913 describes compositions based on fluoro olefins and especially based on tetrafluoropropene or pentafluoropropene. Example 2 reports the miscibility of 1,2,3,3,3-pentafluoropropene (HFO-1225ye) with various lubricant oils, and also that of 1,3,3,3-tetrafluoropropene (HFO-1234ze) with various lubricant oils. Example 3 reports the compatibility of HFO-1234ze and of 3,3,3-trifluoropropene (HFO-1243zf) with lubricant oils of the polyalkylene glycol type.

Document WO 2005/042 663 specifically concerns the miscibility of mixtures of fluoro olefins and of lubricant oils. The examples provided for these mixtures are essentially the same as those in document WO 2004/037 913.

Document WO 2006/094 303 describes a large number of heat-transfer compositions comprising fluoro olefins and additional compounds. Among the numerous compositions cited are mixtures based on 2,3,3,3-tetrafluoropropene (HFO-1234yf) and 1,1,1,2-tetrafluoroethane (HFC-134a). Moreover, the document generally teaches of combining the list of the numerous possible refrigerant mixtures with a list of lubricant oils.

When the heat-transfer compound(s) have poor miscibility with the lubricant oil, said oil has a tendency to be trapped in the evaporator and not return to the compressor, which does not enable correct functioning of the system.

In this regard, there is still a need to develop low-GWP heat-transfer compositions (which have good energy performance), in which the heat-transfer compounds show good miscibility with the lubricant oil.

In particular, HFO-1234yf is a heat-transfer compound that is particularly interesting especially due to its low GWP and its good energy performance. On the other hand, its miscibility with certain lubricant oils is imperfect and limits its application. It is thus desirable to improve the miscibility of compositions based on HFO-1234yf with the usual lubricant oils.

SUMMARY OF THE INVENTION

The invention relates firstly to a composition comprising 2,3,3,3-tetrafluoropropene, 1,1,1,2-tetrafluoroethane and polyalkylene glycol.

According to one embodiment, 2,3,3,3-tetrafluoropropene, 1,1,1,2-tetrafluoroethane and the polyalkylene glycol represent at least 95%, preferably at least 99% and more particularly preferably at least 99.9% of the composition.

According to one embodiment, the composition comprises from 1% to 99% of polyalkylene glycol, preferably from 5% to 50%, more particularly preferably from 10% to 40% and ideally from 15% to 35%.

According to one embodiment, the mass ratio between 2,3,3,3-tetrafluoropropene and 1,1,1,2-tetrafluoroethane is from 1/99 to 99/1, preferably from 25/75 to 95/5, more particularly preferably from 50/50 to 92/8 and ideally from 55/45 to 92/8.

According to one embodiment, the polyalkylene glycol has a viscosity from 1 to 1000 centistokes at 40° C., preferably from 10 to 200 centistokes at 40° C., more particularly preferably from 20 to 100 centistokes at 40° C. and ideally from 40 to 50 centistokes at 40° C.

According to one embodiment, the composition also comprises: one or more additives chosen from heat-transfer compounds, lubricants, stabilizers, surfactants, tracers, fluorescers, odorant agents, solubilizers, and mixtures thereof; preferably one or more additives chosen from stabilizers, surfactants, tracers, fluorescers, odorant agents and solubilizers, and mixtures thereof.

The invention also relates to the use of a polyalkylene glycol as a lubricant oil in a vapor compression circuit, in combination with a heat-transfer fluid comprising, and preferably consisting of, a mixture of 2,3,3,3-tetrafluoropropene and 1,1,1,2-tetrafluoroethane.

According to one embodiment, the polyalkylene glycol is used in a proportion of from 1% to 99%, preferably from 5% to 50%, more particularly preferably from 10% to 40% and ideally from 15% to 35%, relative to the sum of the polyalkylene glycol and of the heat-transfer fluid.

According to one embodiment, the mass ratio between 2,3,3,3-tetrafluoropropene and 1,1,1,2-tetrafluoroethane in the heat-transfer fluid is from 1/99 to 99/1, preferably from 25/75 to 95/5, more particularly preferably from 50/50 to 92/8 and ideally from 55/45 to 92/8.

According to one embodiment, the mass ratio between 2,3,3,3-tetrafluoropropene and 1,1,1,2-tetrafluoroethane in the heat-transfer fluid is from 60/40 to 99.9/0.1, preferably from 68/32 to 99.9/0.1, more particularly preferably from 68/32 to 95/5.

According to one embodiment, the polyalkylene glycol has a viscosity from 1 to 1000 centistokes at 40° C., preferably from 10 to 200 centistokes at 40° C., more particularly preferably from 20 to 100 centistokes at 40° C. and ideally from 40 to 50 centistokes at 40° C.

The invention also relates to a heat-transfer installation comprising a vapor compression circuit containing a heat-transfer composition which is a composition as described above.

According to one embodiment, the installation is chosen from mobile or stationary heat-pump heating, air-conditioning, refrigeration, freezing and Rankine-cycle installations, and especially from motor vehicle air-conditioning installations.

The invention also relates to a process for heating or cooling a fluid or a body by means of a vapor compression circuit containing a heat-transfer fluid, said process successively comprising at least partial evaporation of the heat-transfer fluid, compression of the heat-transfer fluid, at least partial condensation of the heat-transfer fluid and depressurization of the heat-transfer fluid, in which the heat-transfer fluid is combined with a lubricant oil to form a heat-transfer composition, said heat-transfer composition being a composition as described above.

The invention also relates to a process for reducing the environmental impact of a heat-transfer installation comprising a vapor compression circuit containing an initial heat-transfer fluid, said process comprising a step of replacing the initial heat-transfer fluid in the vapor compression circuit with a final heat-transfer fluid, the final heat-transfer fluid having a lower GWP than the initial heat-transfer fluid, in which the final heat-transfer fluid is combined with a lubricant oil to form a heat-transfer composition, said heat-transfer composition being a composition as described above.

The invention also relates to the use of 1,1,1,2-tetrafluoroethane for increasing the miscibility of 2,3,3,3-tetrafluoropropene with a lubricant oil.

According to one embodiment, the lubricant oil is a polyalkylene glycol, and preferably has a viscosity from 1 to 1000 centistokes at 40° C., more preferably from 10 to 200 centistokes at 40° C., more particularly preferably from 20 to 100 centistokes at 40° C. and ideally from 40 to 50 centistokes at 40° C.

According to one embodiment, the 1,1,1,2-tetrafluoroethane is used in a proportion of from 1% to 99%, preferably from 5% to 75%, more particularly preferably from 8% to 50% and ideally from 8% to 45%, relative to the sum of 1,1,1,2-tetrafluoroethane and 2,3,3,3-tetrafluoropropene.

The invention also relates to a kit comprising:
 a heat-transfer fluid comprising 2,3,3,3-tetrafluoropropene and 1,1,1,2-tetrafluoroethane, on the one hand;
 a lubricant oil comprising a polyalkylene glycol, on the other hand; for use in a heat-transfer installation comprising a vapor compression circuit.

The present invention makes it possible to satisfy the needs felt in the prior art. It more particularly provides low-GWP heat-transfer compositions, which have good energy performance, in which the heat-transfer compounds show good miscibility with the lubricant oil.

In particular, the invention provides heat-transfer compositions based on HFO-1234yf, which have improved miscibility with certain lubricant oils such as polyalkylene glycols.

This is accomplished by mixing HFO-1234yf with HFC-134a. Thus, the present inventors have noted that HFC-134a improves the miscibility properties of HFO-1234yf with polyalkylene glycols, beyond that which might be expected by a simple extrapolation of the miscibility properties of HFO-1234yf, on the one hand, and of HFC-134a, on the other hand, with the lubricant oil. There is thus a synergistic effect between HFO-1234yf and HFC-134a from the point of view of the miscibility with the lubricant oil.

The oils of polyalkylene glycol type have good lubricant power, a low flow point, good fluidity at low temperature, and good compatibility with the elastomers generally present in a vapor compression circuit. They are moreover relatively less expensive than other lubricant oils and are oils whose use is currently very widespread in certain fields, and especially in the field of motor vehicle air-conditioning. It is therefore very advantageous to improve the miscibility of HFO-1234yf with a lubricant oil of the polyalkylene glycol type, so as to be able to use this heat-transfer compound to a wider extent in combination with this lubricant oil.

BRIEF DESCRIPTION OF THE FIGURES

FIG. 1 is a graph representing the miscibility of various mixtures of HFO-1234yf and HFC-134a with a polyalkylene glycol ND8 oil. The proportion of HFC-134a relative to the mixture of HFO-1234yf and HFC-134a is indicated on the x-axis and ranges from 0 to 100%, and the temperature from which the mixture ceases to be miscible with the oil is indicated on the y-axis (in ° C.). The experimental data are represented by black circles. The abbreviations NM and M denote, respectively, the non-miscibility zone and the miscibility zone. All the results are obtained with a content of oil ND8 of 17% relative to the sum of the three compounds HFO-1234yf/HFC-134a and oil ND8. Reference will be made to the example below for further details.

DESCRIPTION OF EMBODIMENTS OF THE INVENTION

The invention is now described in greater detail and without limitation in the description that follows.

Unless otherwise mentioned, throughout the application the indicated proportions of compounds are given as mass percentages.

According to the present patent application, the global warming potential (GWP) is defined relative to carbon dioxide and relative to a duration of 100 years, according to the method indicated in "The scientific assessment of ozone depletion, 2002, a report of the World Meteorological Association's Global Ozone Research and Monitoring Project".

The term "heat-transfer compound" or, respectively, "heat-transfer fluid" (or coolant fluid) means a compound or, respectively, a fluid that is capable of absorbing heat by evaporating at low temperature and low pressure and of expelling heat by condensing at high temperature and high pressure, in a vapor compression circuit. In general, a heat-transfer fluid may comprise one, two, three or more than three heat-transfer compounds.

The term "heat-transfer composition" means a composition comprising a heat-transfer fluid and optionally one or more additives that are not heat-transfer compounds for the intended application.

The invention is based on the use of two heat-transfer compounds, namely HFO-1234yf and HFC-134a, and of a lubricant oil, to form a heat-transfer composition.

The heat-transfer composition may be introduced in unmodified form into a vapor compression circuit. Alternatively, the heat-transfer fluid (namely HFO-1234yf and HFC-134a), on the one hand, and the lubricant oil, on the other hand, may be introduced separately into the circuit, at the same point or otherwise. The individual heat-transfer compounds (HFO-1234yf and HFC-134a) may also be introduced separately.

The lubricant oil is preferably of the polyalkylene glycol type.

In general, the polyalkylene glycol oil that is suitable for use in the context of the invention comprises from 5 to 50 repeated oxyalkylene units, each containing from 1 to 5 carbon atoms.

The polyalkylene glycol may be linear or branched. It may be a homopolymer or a copolymer of 2, 3 or more than 3 groups chosen from oxyethylene, oxypropylene, oxybutylene and oxypentylene groups and combinations thereof.

Preferred polyalkylene glycols comprise at least 50% of oxypropylene groups. For the purposes of the invention, the polyalkylene glycol may comprise polyalkylene glycols of different formulae as a mixture.

Suitable polyalkylene glycols are described in document U.S. Pat. No. 4,971,712. Other suitable polyalkylene glycols are polyalkylene glycols containing hydroxyl groups at each end, as described in document U.S. Pat. No. 4,755,316. Other suitable polyalkylene glycols are polyalkylene glycols having a capped hydroxyl end. The hydroxyl group may be capped with an alkyl group containing from 1 to 10 carbon atoms (and optionally containing one or more heteroatoms such as nitrogen), or a fluoroalkyl group containing heteroatoms such as nitrogen, or a fluoroalkyl group as described in document U.S. Pat. No. 4,975,212, or other similar groups.

When the two hydroxyl ends of the polyalkylene glycol are capped, the same end group or a combination of two different groups may be used.

The end hydroxyl groups may also be capped by forming an ester with a carboxylic acid, as is described in document U.S. Pat. No. 5,008,028. The carboxylic acid may also be fluorinated.

When the two ends of the polyalkylene glycol are capped, one or the other may be capped with an ester, or alternatively one end may be capped with an ester and the other end may be free or may be capped with one of the abovementioned alkyl, heteroalkyl or fluoroalkyl groups.

Examples of commercially available lubricant oils of polyalkylene glycol type are the Goodwrench oils from General Motors and Mopar-56 from Daimler-Chrysler. Other suitable oils are manufactured by Dow Chemical and Denso.

The viscosity of the lubricant oil may be, for example, from 1 to 1000 centistokes at 40° C., preferably from 10 to 200 centistokes at 40° C., more particularly preferably from 20 to 100 centistokes at 40° C. and ideally from 40 to 50 centistokes at 40° C.

The viscosity is determined according to the ISO viscosity grades, in accordance with standard ASTM D2422.

The oil sold by Denso under the name NDB, with a viscosity of 46 centistokes, is particularly suitable.

The proportion of lubricant oil that needs to be used in combination with the heat-transfer fluid mainly depends on the type of installation concerned. Specifically, the total amount of lubricant oil in the installation depends mainly on the nature of the compressor, whereas the total amount of heat-transfer fluid in the installation depends mainly on the exchangers and on the pipework.

In general, the proportion of lubricant oil in the heat-transfer composition, or, in other words, relative to the sum of the lubricant oil and of the heat-transfer fluid, is from 1% to 99%, preferably from 5% to 50%, for example from 10% to 40% or from 15% to 35%.

According to one particular embodiment, the lubricant oil used consists of the polyalkylene glycol described above, with the exception of any other lubricant compound.

According to an alternative embodiment, another lubricant oil is used in combination with the polyalkylene glycol. It may be chosen especially from oils of mineral origin, silicone oils, paraffins of natural origin, naphthenes, synthetic paraffins, alkylbenzenes, poly-α-olefins, polyol esters and/or polyvinyl ethers. Polyol esters and polyvinyl ethers are preferred. When another lubricant oil is used in combination with the polyalkylene glycol it is preferable for the miscibility of the HFO-1234yf and/or of the HFC-134a with this oil to be greater than the respective miscibility of HFO-1234yf and/or of HFC-134a with the polyalkylene glycol. This is especially the case for at least some of the oils of polyol ester or poly vinyl ether type.

The heat-transfer compounds mainly used in the context of the present invention are HFO-1234yf and HFC-134a.

However, the heat-transfer compositions according to the invention may optionally comprise one or more additional heat-transfer compounds, besides HFO-1234yf and HFC-134a. These additional heat-transfer compounds may be chosen especially from hydrocarbons, hydrofluorocarbons, ethers, hydrofluoro ethers and fluoro olefins.

According to particular embodiments, the heat-transfer fluids according to the invention may be ternary compositions (consisting of three heat-transfer compounds) or quaternary compositions (consisting of four heat-transfer compounds), in combination with the lubricant oil to form the heat-transfer compositions according to the invention.

However, binary heat-transfer fluids are preferred.

The term "binary fluid" means either a fluid consisting of a mixture of HFO-1234yf and HFC-134a; or a fluid consisting essentially of HFO-1234yf and HFC-134a, but which may contain impurities to a proportion of less than 1%, preferably less than 0.5%, preferably less than 0.1%, preferably less than 0.05% and preferably less than 0.01%.

According to particular embodiments, the proportion of HFO-1234yf in the heat-transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

According to particular embodiments, the proportion of HFC-134a in the heat-transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

The values given in the three preceding paragraphs apply to the heat-transfer fluid without lubricant oil, and not to the heat-transfer composition which comprises the heat-transfer fluid, the lubricant oil and optionally other additives.

The other additives that may be used in the context of the invention may be chosen especially from stabilizers, surfactants, tracers, fluorescers, odorant agents and solubilizers.

The stabilizer(s), when they are present, preferably represent not more than 5% by mass in the heat-transfer composition. Among the stabilizers, mention may be made especially of nitromethane, ascorbic acid, terephthalic acid, azoles such as tolutriazole or benzotriazole, phenolic compounds such as tocopherol, hydroquinone, t-butylhydroquinone, 2,6-di-tert-butyl-4-methylphenol, epoxides (optionally fluorinated or perfluorinated alkyl, or alkenyl or aromatic) such as n-butyl glycidyl ether, hexanediol diglycidyl ether, allyl glycidyl ether or butylphenyl glycidyl ether, phosphites, phosphonates, thiols and lactones.

As tracers (which can be detected), mention may be made of deuterated or non-deuterated hydrofluorocarbons, deuterated hydrocarbons, perfluorocarbons, fluoro ethers, bromo compounds, iodo compounds, alcohols, aldehydes, ketones, nitrous oxide and combinations thereof. The tracer is different from the heat-transfer compound(s) of which the heat-transfer fluid is composed.

Examples of solubilizers that may be mentioned include hydrocarbons, dimethyl ether, polyoxyalkylene ethers, amides, ketones, nitriles, chlorocarbons, esters, lactones, aryl ethers, fluoro ethers and 1,1,1-trifluoroalkanes. The solubilizer is different from the heat-transfer compound(s) of which the heat-transfer fluid is composed.

Fluorescers that may be mentioned include naphthalimides, perylenes, coumarins, anthracenes, phenanthracenes, xanthenes, thioxanthenes, naphthoxanthenes and fluoresceins, and derivatives and combinations thereof.

Odorant agents that may be mentioned include alkylacrylates, allylacrylates, acrylic acids, acrylic esters, alkyl ethers, alkyl esters, alkynes, aldehydes, thiols, thio ethers, disulfides, allylisothiocyanates, alkanoic acids, amines, norbornenes, norbornene derivatives, cyclohexene, heterocyclic aromatic compounds, ascaridole and o-methoxy(methyl)phenol, and combinations thereof.

The heat-transfer process according to the invention is based on the use of an installation comprising a vapor compression circuit which contains a heat-transfer composition (namely a heat-transfer fluid and at least one lubricant oil). The heat-transfer process may be a process for heating or cooling a fluid or a body.

The vapor compression circuit comprises at least one evaporator, a compressor, a condenser and a depressurizer, and also lines for transporting the fluid between these components. The evaporator and the condenser comprise a heat exchanger for exchanging heat between the heat-transfer fluid and another fluid or body.

As compressor, use may be made especially of a single-stage or multi-stage centrifugal compressor or a centrifugal mini-compressor. Rotary, piston or screw compressors may also be used. The compressor may be driven by an electric motor or by a gas turbine (for example fed with the exhaust gases of a vehicle, or mobile applications) or by gearing.

The installation may comprise an electricity-generating turbine (Rankine cycle).

The installation may also optionally comprise at least one heat-exchange fluid circuit used for transmitting heat (with or without a change of state) between the heat-transfer fluid circuit and the fluid or body to be heated or cooled.

The installation may also optionally comprise two (or more) vapor compression circuits, containing identical or different heat-transfer fluids. For example, the vapor compression circuits may be coupled together.

The vapor compression circuit operates according to a standard vapor compression cycle. The cycle comprises the change of state of the heat-transfer fluid from a liquid phase (or liquid/vapor two-phase system) to a vapor phase at a relatively low pressure, followed by compression of the fluid in vapor phase up to a relatively high pressure, the change of state (condensation) of the heat-transfer fluid from the vapor phase to the liquid phase at a relatively high pressure, and reduction of the pressure to recommence the cycle.

In the case of a cooling process, heat derived from the fluid or body that is being cooled (directly or indirectly, via a heat-exchange fluid) is absorbed by the heat-transfer fluid, during the evaporation of the latter, this taking place at a relatively low temperature relative to the environment. The cooling processes comprise air-conditioning processes (with mobile installations, for example in vehicles, or stationary installations), refrigeration and freezing processes or cryogenic processes.

In the case of a heating process, heat is yielded (directly or indirectly, via a heat-exchange fluid) from the heat-transfer fluid, during the condensation of the latter, to the fluid or body that is being heated, this taking place at a relatively high temperature relative to the environment. In this case, the installation for transferring heat is known as a "heat pump".

It is possible to use any type of heat exchanger for the implementation of the heat-transfer fluids according to the invention, and especially co-current heat exchangers or, preferably, counter-current heat exchangers. It is also possible to use micro-channel exchangers.

The invention in particular makes it possible to use cooling processes at moderate temperature, i.e. those in which the temperature of the cooled fluid or body is from −15° C. to 15° C., preferably from −10° C. to 10° C. and more particularly preferably from −5° C. to 5° C. (ideally about 0° C.).

The invention also makes it possible to use heating processes at moderate temperature, i.e. those in which the temperature of the heated fluid or body is from 30° C. to 80° C., preferably from 35° C. to 55° C. and more particularly preferably from 40° C. to 50° C. (ideally about 45° C.).

In the processes of "cooling or heating at moderate temperature" mentioned above, the inlet temperature of the heat-transfer fluid into the evaporator is preferably from −20° C. to 10° C., especially from −15° C. to 5° C., more particularly preferably from −10° C. to 0° C., for example about −5° C.; and the condensation start temperature of the heat-transfer fluid in the condenser is preferably from 25° C. to 90° C., especially from 30° C. to 70° C., more particularly preferably from 35° C. to 55° C., for example about 50° C. These processes may be refrigeration, air-conditioning or heating processes.

The invention also makes it possible to use cooling processes at low temperature, i.e. those in which the temperature of the cooled fluid or body is from −40° C. to −10° C., preferably from −35° C. to −25° C. and more particularly preferably from −30° C. to −20° C. (ideally about −25° C.).

In the "low-temperature cooling" processes mentioned above, the inlet temperature of the heat-transfer fluid into the evaporator is preferably from −45° C. to −15° C., especially from −40° C. to −20° C. and more particularly preferably from −35° C. to −25° C., for example about −30° C.; and the condensation start temperature of the heat-transfer fluid in the condenser is preferably from 25° C. to 80° C., especially from 30° C. to 60° C. and more particularly preferably from 35° C. to 55° C., for example about 40° C.

It should be noted that the addition of HFC-134a to a heat-transfer fluid consisting of HFO-1234yf (or comprising HFO-1234yf) improves the miscibility of the heat-transfer fluid with the lubricant oil, i.e. increases the threshold temperature for appearance of the non-miscibility zone (defined as being the temperature from which the compounds in the liquid phase form an emulsion), and thus makes it possible to increase the possibilities of use of the heat-transfer fluid, for example by enabling use at a higher condensation temperature.

More generally, the invention enables the replacement of any heat-transfer fluid in all heat transfer applications, for example in motor vehicle air-conditioning. For example, the heat-transfer fluids and heat-transfer compositions according to the invention may serve to replace:

1,1,1,2-tetrafluoroethane (R134a);
1,1-difluoroethane (R152a);
1,1,1,3,3-pentafluoropropane (R245fa);
mixtures of pentafluoroethane (R125), 1,1,1,2-tetrafluoroethane (R134a) and isobutane (R600a), namely R422;
chlorodifluoromethane (R22);
the mixture of 51.2% chloropentafluoroethane (R115) and 48.8% chlorodifluoromethane (R22), namely R502;
any hydrocarbon;
the mixture of 20% difluoromethane (R32), 40% pentafluoroethane (R125) and 40% 1,1,1,2-tetrafluoroethane (R134a), namely R407A;
the mixture of 23% difluoromethane (R32), 25% pentafluoroethane (R125) and 52% 1,1,1,2-tetrafluoroethane (R134a), namely R407C;
the mixture of 30% difluoromethane (R32), 30% pentafluoroethane (R125) and 40% 1,1,1,2-tetrafluoroethane (R134a), namely R407F;
R1234yf (2,3,3,3-tetrafluoropropene);
R1234ze (1,3,3,3-tetrafluoropropene).

EXAMPLE

The example that follows illustrates the invention without limiting it.

In this example, the miscibility of HFO-1234yf, HFC-134a and mixtures thereof with a lubricant oil of the type PAG ND8 is studied.

An autoclave is placed in a glass-panelled tank fed with a thermostatically maintained bath of water or of glycol-water depending on the test temperatures, from −30° C. to +80° C.

For each heat-transfer fluid tested (mixture of HFO-1234yf and HFC-134a in given proportions), the heat-transfer fluid is introduced into the autoclave. Next, a first amount of defined lubricant oil is added, and the mixture is stirred. The temperature in the autoclave is increased until an emulsion is obtained, indicating the non-miscibility of the mixture. The mixture is then cooled, an additional amount of oil is added thereto and this operation is performed iteratively.

This procedure makes it possible to produce, for each given HFO-1234yf/HFC-134a transfer fluid, a curve for visualization of the non-miscibility zone of the mixture with the oil PAG, as a function of the temperature.

Reciprocally, exploitation of the data makes it possible to determine, for a given lubricant oil concentration, the non-miscibility threshold temperature as a function of the proportion of HFC-134a in the HFO-1234yf/HFC-134a mixture. This is shown in FIG. 1, for an amount of lubricant oil of 17%.

When the mixture does not contain any HFC-134a, the emulsion appears at a temperature of 26° C. On the other hand, when the mixture does not contain any HFO-1234yf, the emulsion appears at a temperature of 69° C. This makes it possible to plot a theoretical dashed line, representing the expected temperature for the appearance of an emulsion with a mixture of HFO-1234yf and of HFC-134a, this being obtained by weighting of the respective miscibility temperatures.

Experimentally, it is noted, however, that the miscibility zone is larger than that theoretically expected. This means that there is a synergistic effect between HFO-1234yf and HFC-134a with regard to the miscibility with the lubricant oil.

A similar result is obtained with an amount of lubricant oil of 30%, for example, instead of 17%. It is thus observed that the addition of 20% HFC-134a to HFO-1234yf makes it possible to improve the miscibility zone by about 10 degrees relative to the expected value.

The invention claimed is:

1. A composition comprising 2,3,3,3-tetrafluoropropene, 1,1,1,2-tetrafluoroethane and polyalkylene glycol, wherein the composition comprises from 5% to 50% of polyalkylene glycol.

2. The composition as claimed in claim 1, in which 2,3,3,3-tetrafluoropropene, 1,1,1,2-tetrafluoroethane and the polyalkylene glycol represent at least 95% of the composition.

3. The composition as claimed in claim 1, in which the mass ratio between 2,3,3,3-tetrafluoropropene and 1,1,1,2-tetrafluoroethane is from 1/99 to 99/1.

4. The composition as claimed in claim 1, in which the polyalkylene glycol has a viscosity from 1 to 1000 centistokes at 40° C.

5. The composition as claimed in claim 1, also comprising: one or more additives chosen from heat-transfer compounds, lubricants, stabilizers, surfactants, tracers, fluorescers, odorant agents, solubilizers, and mixtures thereof.

6. A method of lubricating a vapor compression circuit, the method comprising lubricating the circuit with a lubricant oil, the lubricant oil comprising polyalkylene glycol in combination with a heat-transfer fluid comprising a mixture of 2,3,3,3-tetrafluoropropene and 1,1,1,2-tetrafluoroethane, wherein the polyalkylene glycol is used in a proportion of from 5% to 50% relative to the sum of the polyalkylene glycol and of the heat-transfer fluid.

7. The method as claimed in claim 6, in which the mass ratio between 2,3,3,3-tetrafluoropropene and 1,1,1,2-tetrafluoroethane in the heat-transfer fluid is from 1/99 to 99/1.

8. The method as claimed in claim 6, in which the polyalkylene glycol has a viscosity from 1 to 1000 centistokes at 40° C.

9. A heat-transfer installation comprising a vapor compression circuit containing a heat-transfer composition which is a composition as claimed in claim 1.

10. The installation as claimed in claim 9, chosen from mobile or stationary heat-pump heating, air-conditioning, refrigeration, freezing and Rankine-cycle installations.

11. A process for heating or cooling a fluid or a body by means of a vapor compression circuit containing a heat-transfer fluid, said process successively comprising at least partial evaporation of the heat-transfer fluid, compression of the heat-transfer transfer fluid, at least partial condensation of the heat-transfer fluid and depressurization of the heat-transfer fluid, in which the heat-transfer fluid is combined with a lubricant oil to form a heat-transfer composition, said heat-transfer composition being a composition as claimed in claim 1.

12. A process for reducing the environmental impact of a heat-transfer installation comprising a vapor compression circuit containing an initial heat-transfer fluid, said process comprising a step of replacing the initial heat-transfer fluid in the vapor compression circuit with a final heat-transfer fluid, the final heat-transfer fluid having a lower GWP than the initial heat-transfer fluid, in which the final heat-transfer fluid is combined with a lubricant oil to form a heat-transfer composition, said heat-transfer composition being a composition as claimed in claim 1.

13. A method for increasing the miscibility of 2,3,3,3-tetrafluoropropene with a lubricant oil, the method comprising the addition of 1,1,1,2-tetrafluoroethane to 2,3,3,3-tetrafluoropropene and the lubricant oil, wherein the lubricant oil comprises polyalkylene glycol, and wherein the polyalkylene glycol is used in a proportion of from 5% to 50% relative to the sum of the polyalkylene glycol, 1,1,1,2-tetrafluoroethane, and 2,3,3,3-tetrafluoropropene.

14. The method as claimed in claim 13, in which the polyalkylene glycol has a viscosity from 1 to 1000 centistokes at 40° C.

15. The method as claimed in claim 13, in which the 1,1,1,2-tetrafluoroethane is used in a proportion of from 1% to 99% relative to the sum of 1,1,1,2-tetrafluoroethane and 2,3,3,3-tetrafluoropropene.

16. A kit comprising:
a heat-transfer fluid comprising 2,3,3,3-tetrafluoropropene and 1,1,1,2-tetrafluoroethane;
a lubricant oil comprising a polyalkylene glycol;
the kit adapted for use in a heat-transfer installation comprising a vapor compression circuit, wherein the polyalkylene glycol is used in a proportion of from 5% to 50% relative to the sum of the polyalkylene glycol and of the heat-transfer fluid.

17. The composition as claimed in claim 1, in which the mass ratio between 2,3,3,3-tetrafluoropropene and 1,1,1,2-tetrafluoroethane is from 25/75 to 95/5.

\* \* \* \* \*